G. M. SHORT.
GRASS DIVIDER.
APPLICATION FILED APR. 1, 1919.
1,311,016.
Patented July 22, 1919.
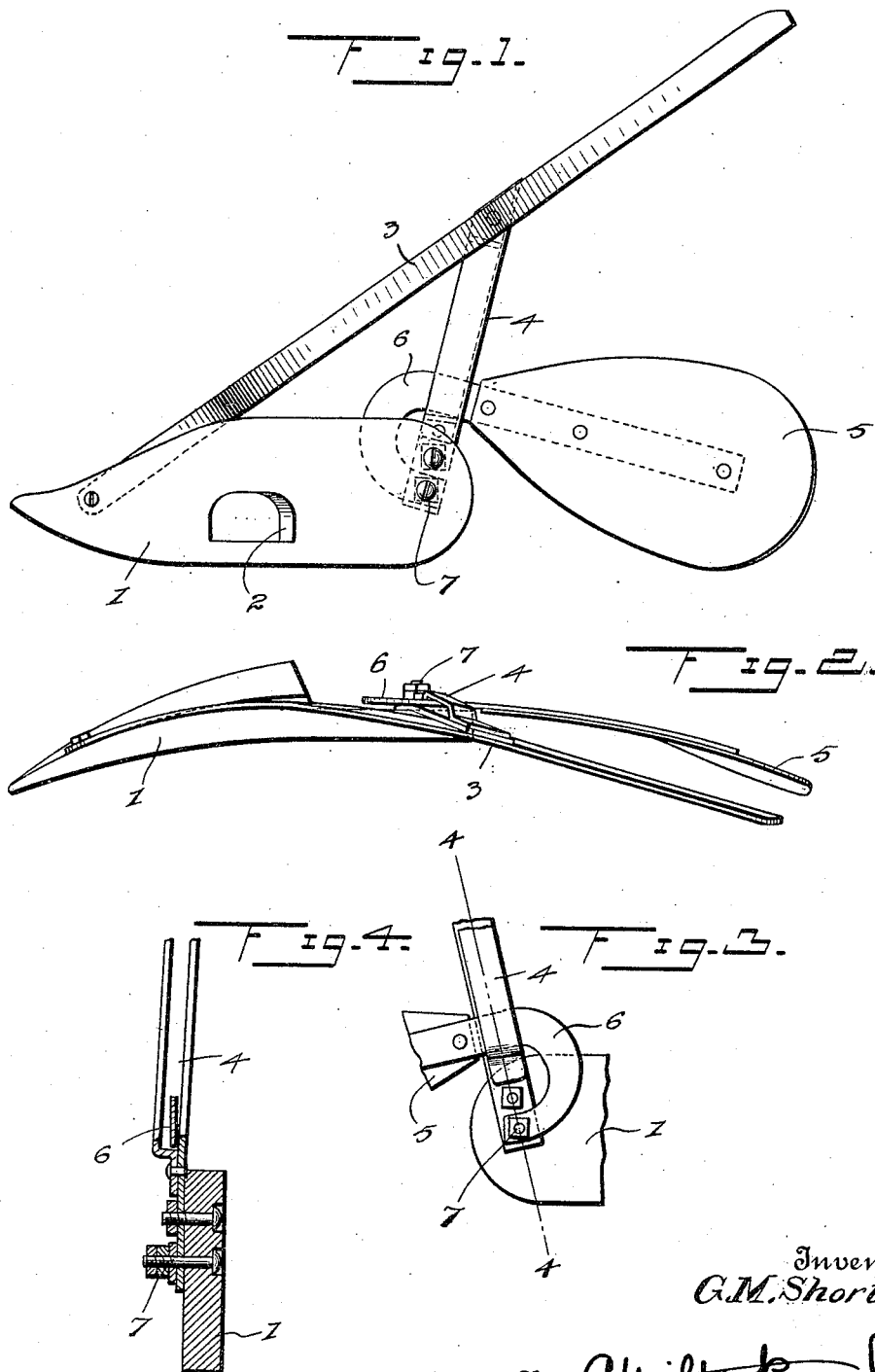
Inventor
G. M. Short.
By Milton Buck
Attorney

UNITED STATES PATENT OFFICE.

GEORGE M. SHORT, OF LITCHFIELD, CALIFORNIA.

GRASS-DIVIDER.

1,311,016. Specification of Letters Patent. Patented July 22, 1919.

Application filed April 1, 1919. Serial No. 286,713.

*To all whom it may concern:*

Be it known that I, GEORGE M. SHORT, a citizen of the United States, residing at Litchfield, in the county of Lassen and State of California, have invented certain new and useful Improvements in Grass-Dividers, of which the following is a specification.

This invention relates to grass dividers adapted to be used at the end of a cutter bar of the cutting apparatus of a mower, and it consists in the novel features hereinafter described and claimed.

An object of the invention is to provide a divider of the character indicated which is of simple and durable structure, and which will effectually turn or cast the grass as it is cut away from the grass which is left standing so that a clear path is left adjacent the standing grass over which the inner portion of the cutting apparatus may pass when the mower makes its next turn around the field.

With this object in view, the grass divider comprises a curved shoe adapted to be applied to the bar of a cutting apparatus and having an upwardly and rearwardly disposed arm attached thereto, said arm being inwardly curved from its point of attachment with the shoe. A blade is provided with a goose-neck shank or stem which is pivotally connected with the rear portion of the shoe, and a guide is mounted between the rear portion of the shoe and the arm and loosely receives the goose-neck portion of the blade. Said blade is free to move vertically within the guide and the free portion of the blade strikes the cut grass and assists the arm in throwing or casting the cut grass away from the standing grass.

In the accompanying drawing:—

Figure 1, is a side elevation of the grass divider.

Fig. 2, is a top plan view of the same.

Fig. 3, is a detailed elevation of the intermediate portion of the divider looking at the side thereof opposite that side which is illustrated in Fig. 1.

Fig. 4, is a fragmentary sectional view cut on the line 4—4 of Fig. 3.

As illustrated in the accompanying drawing the grass divider comprises a shoe 1, which is curved longitudinally, and which is provided at its intermediate portion with an opening 2, adapted to receive the end portion of a bar (not shown) of a cutting apparatus of a mower. An upwardly and rearwardly extending arm 3, is attached at its forward end to the forward portion of the shoe 1, and the said arm is curved longitudinally as best illustrated in Fig. 2, of the drawing. An outer guide arm 4, is interposed between the rear portion of the shoe 1, and the intermediate portion of the arm. As shown in Fig. 4, an outer guide bar 4', having an offset shoulder is fixed to said bar 4 in parallel spaced relation. The said bars are attached or secured to the said parts and the bars are spaced from each other at their intermediate portions, thereby forming a guide opening.

The divider also includes a pear-shaped blade 5, which is preferably made of sheet metal. A goose-neck shank or stem 6, is carried by the blade and the return bent portion thereof projects beyond the forward end of the blade 5. The intermediate portion of the shank 6, is located in the space between the intermediate portions of the guides 4 and the extremity of the shank 6 is pivoted to the shoe 1 and guides 4, as at 7. As shown the goose-neck has its upper portion resting on said shoulder.

Therefore, it will be seen that as the shoe 1, passes between the grass which is standing and the grass which is being cut it will divide the grass which is about to be cut from the grass which is to be left standing. The grass which is cut by the cutting apparatus (not shown) first encounters the bar 3, and is moved away from the grass which is left standing. The cut grass then encounters the blade 5, and inasmuch as the said blade is pivotally mounted it may strike the grass and cast or thrust the same away from the grass which is left standing and thus leave an unobstructed path between the cut grass and the standing grass.

Having described the invention, what is claimed, is:—

The combination in a grass divider of the character described including a shoe and a rearwardly and upwardly extending arm, a supporting bar interposed between the rear portion of said shoe and the intermediate portion of said arm, an outer guide bar having an offset shoulder secured to said supporting bar in parallel spaced relation thereto, a pivot bolt secured to said shoe below the end of said bar, a goose-neck shank having its lower end secured to said bolt and curving rearwardly therefrom, with its upper end resting on said shoulder, and a pear shaped dividing blade secured to said shank, all arranged so that said blade may move upward, as and for the purpose set forth.

In testimony whereof I affix my signature.

GEORGE M. SHORT.